United States Patent
Nalder

(10) Patent No.: US 8,037,249 B1
(45) Date of Patent: Oct. 11, 2011

(54) ASYNCHRONOUS MEMORY ACCESS QUEUING

(75) Inventor: Greg Nalder, Goodyear, AZ (US)

(73) Assignee: Cypress Semiconductor Corporation, San Jose, CA (US)

(*) Notice: Subject to any disclaimer, the term of this patent is extended or adjusted under 35 U.S.C. 154(b) by 586 days.

(21) Appl. No.: 11/863,013

(22) Filed: Sep. 27, 2007

Related U.S. Application Data

(60) Provisional application No. 60/827,281, filed on Sep. 28, 2006.

(51) Int. Cl.
*G06F 13/00* (2006.01)
*G06F 13/28* (2006.01)

(52) U.S. Cl. ........ 711/118; 711/163; 711/154; 711/159; 711/E12.075

(58) Field of Classification Search .................. None
See application file for complete search history.

(56) References Cited

U.S. PATENT DOCUMENTS

| | | | |
|---|---|---|---|
| 2004/0168035 A1* | 8/2004 | Romanufa et al. | 711/165 |
| 2005/0289549 A1* | 12/2005 | Cierniak et al. | 718/102 |
| 2009/0037936 A1* | 2/2009 | Serebrin | 719/318 |

* cited by examiner

*Primary Examiner* — Reginald Bragdon
*Assistant Examiner* — Eric S Cardwell

(57) ABSTRACT

A method for queuing asynchronous memory accesses includes pinning memory buffers in a managed memory environment, issuing data transfer requests to a peripheral device, each request corresponding to at least one of the pinned memory buffers, and asynchronously accessing at least one of the pinned buffers responsive to the requests.

15 Claims, 4 Drawing Sheets

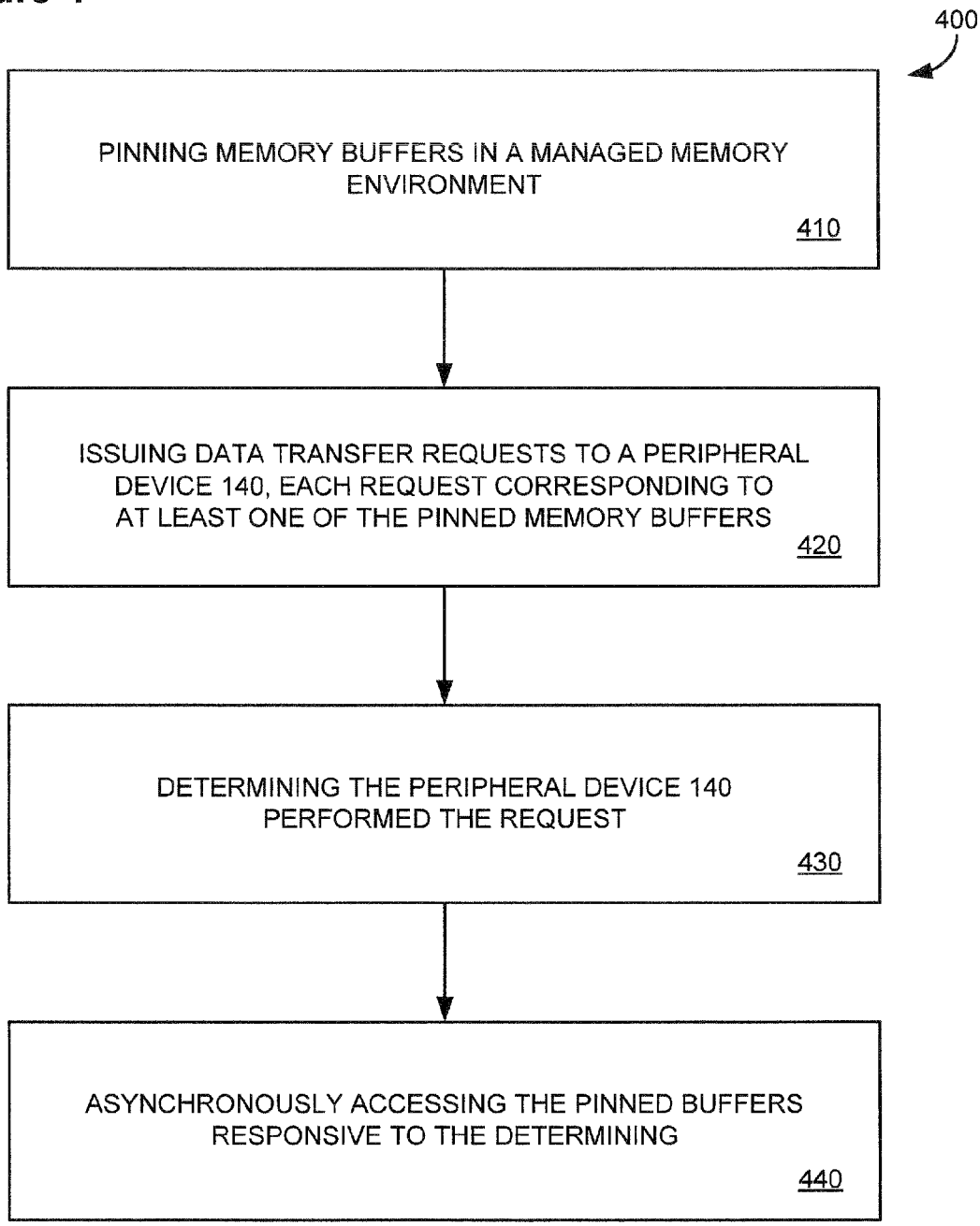

ASYNCHRONOUS MEMORY ACCESS QUEUING

RELATED APPLICATIONS

This application claims the benefit of U.S. Provisional Application No. 60/827,281, filed Sep. 28, 2006, which is incorporated herein by reference.

FIELD OF THE INVENTION

This invention relates generally to memory systems, and more specifically to asynchronous memory access queuing.

BACKGROUND OF THE INVENTION

Many processing systems manage memory explicitly by allowing applications to expressly allocate and de-allocate buffers in the memory. For instance, applications allocate memory by requesting and receiving pointers to memory buffers from a processing system, and de-allocate the memory buffers by passing the pointers back to the processing system. Often, however, applications fail to de-allocate the memory buffers resulting in memory leakage, or a reduction in available memory for the processing systems.

In another memory management scheme, processing systems actively manage their memory by allowing applications indirect control over the memory. For instance, a processing system may provide an application with a variable corresponding to a block of memory, as opposed to address pointers to specific buffers in the memory, and automatically determine when to release the variable from the application. Since the actual memory buffers associated with the variable are hidden from the application, the processing system attains the ability to automatically relocate the memory block among various memory buffers, for example, with the memory management daemon or garbage collector, without notifying the associated application of the relocation.

Although the managed memory environment reduces, if not eliminates, memory leakage in processing systems, certain applications, such as asynchronous data streaming, require that memory buffers remain static throughout a duration of memory access operations. Since conventional processing systems operating a managed memory environment do not statically allocate memory buffers, these applications either fail to perform or are performed inefficiently.

DESCRIPTION OF THE DRAWINGS

The invention may be best understood by reading the disclosure with reference to the drawings.

FIG. 4 shows another example flowchart illustrating embodiments of the memory system shown in FIG. 1.

DETAILED DESCRIPTION

Figure 1:
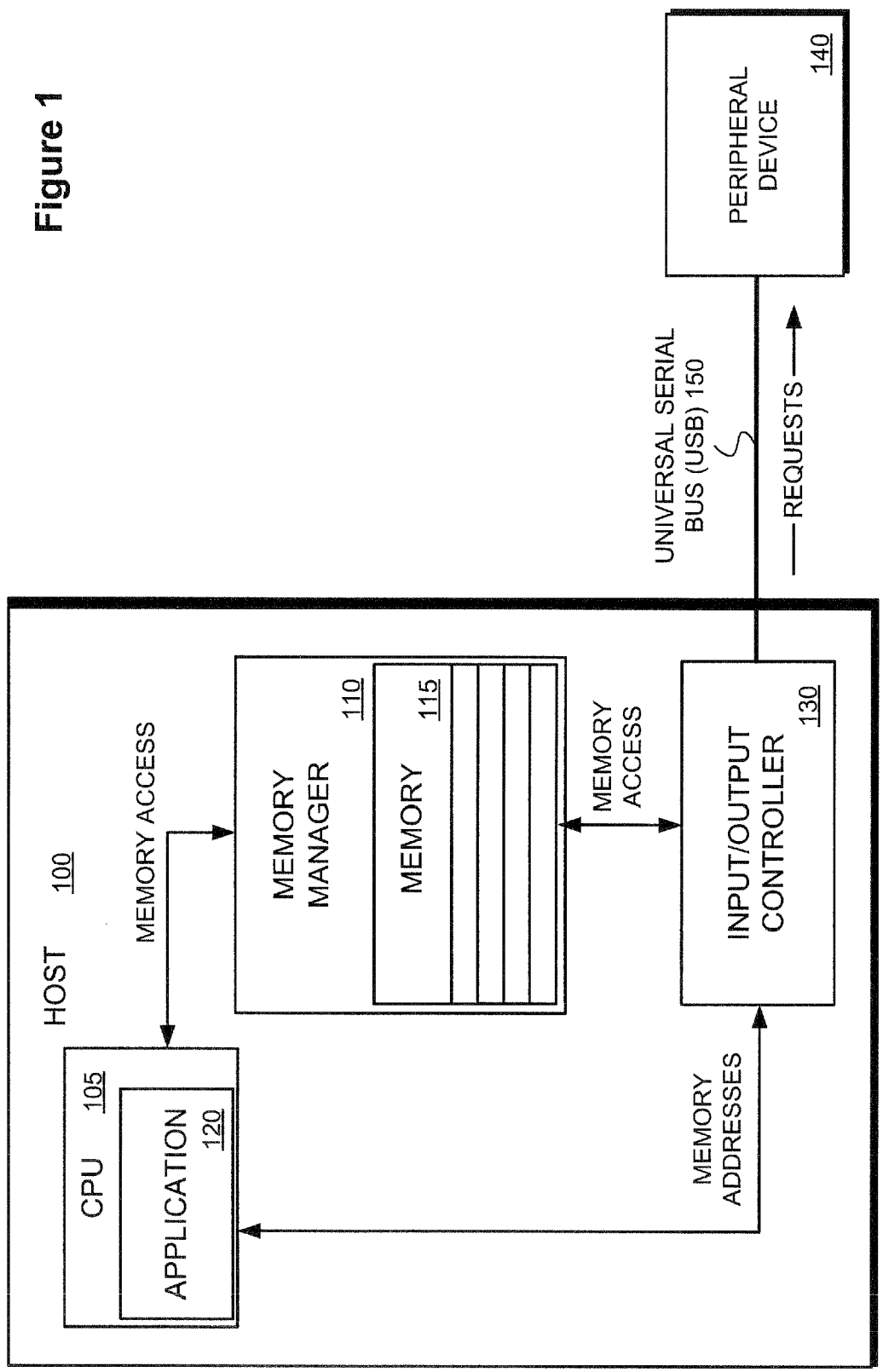
FIG. 1 illustrates, in block form, a memory system useful with embodiments of the present invention.

FIG. 1 illustrates, in block form, a memory system useful with embodiments of the present invention. Referring to FIG. 1, the memory system includes a host 100 coupled to a peripheral device 140 via a Universal Serial Bus (USB) 150. The host 100 includes a memory manager 110 to implement a managed (or pointer-less) memory environment in the host 100, for example, by actively managing a memory 115. In some embodiments, the memory manager 110 may be implemented as part of a Java-based or .NET runtime environment, or any other pointer-less memory management scheme. The memory manager 110 may be a separate process called a memory management daemon or garbage collector that automatically relocates data or buffers stored in the memory 115.

The host 100 includes an application 120, such as a data steaming application, to interact with the memory manager 110 and store data to the memory 115. The application 120 may be executed or performed by a central processing unit (CPU) 105 or any other processing core having one or more processors. The application 120 may send memory commands to the memory manager 110 requesting to use at least a portion the memory 115. For instance, the application 120 may request a block of managed memory and receive a variable from the memory manager 110. The application 120 may then store data to the memory 115 according to the variable. Since the application 120 stores the data in a managed memory environment, the memory manager 115 may automatically relocate the stored data and/or automatically release the variable from the application 120.

In some embodiments, such as in data streaming applications, the application 120 may explicitly manage at least a portion of the memory 115 by pinning specific memory buffers and temporarily prohibiting the memory manager 110 from automatically relocating the pinned buffers according to its implemented managed memory scheme. In some managed memory systems, the application 120 may designate a managed buffer of memory 115, as immovable or fixed. For instance, a C-sharp (C#) programming language provides a keyword fixed that allows for temporary immobilization of a memory buffer in the managed memory environment implemented by the memory manager 110.

The host 100 includes an input/output (10) controller 130 to exchange data with the peripheral device 140 over the USB 150. Although FIG. 1 shows the host 100 communicating with the peripheral device 140 over USB 150, in some embodiments the communication may be made over other transmission media, e.g., Firewire, Electronic Industries Alliance (EIA) standard RS-232, etc., with any associated protocol.

The IO controller 130 may perform operations as directed by the application 120 and exchange data between the peripheral device 140 and pinned buffers in memory 115. For instance, the application 120 may provide the IO controller 130 with data storage or retrieval operations and addresses in memory 115 to perform the operations. The IO controller 130 may then directly access the memory 115 to facilitate the exchange of data between the memory 115 and the peripheral device 140 over the USB 150.

The application 120 may dynamically pin multiple buffers in memory 115. The IO controller 130, in turn, may issue multiple requests to the peripheral device 140 over the USB 150. Each request may be a memory access request that prompts the peripheral device 140 to retrieve data from or store data to the pinned buffers in memory 115. In USB embodiments, these requests may be isochronous, interrupt, control or bulk-endpoint transport requests, or any other request for the peripheral device 140 to exchange data with the pinned memory in the host 100. One example of pseudo-code for pinning of buffers in memory 115 is shown and described below.

```
fixed (byte* b0 = buffers[0]) // Pin a First Buffer
{
  BeginDataXfer(buffers[0]); // Submit First Request to Peripheral
    Device 140
  fixed (byte* b1 = buffers[1]) // Pin a Second buffer
  {
    BeginDataXfer(buffers[1]); // Submit Second Request
    fixed (byte* b2 = buffers[2]) // Pin a Third Buffer
    {
      BeginDataXfer(buffers[2]); // Submit Third Request
      fixed (byte* b3 = buffers[3]) // Pin a Fourth Buffer
      {
        BeginDataXfer(buffers[3]); // Submit Fourth Request
        j = 0;
        for ( ; bTransferring; ) // Data Transfer Loop
        {
          WaitForXfer(j); // Await Request Completion
          FinishDataXfer(buffers[j]); // Complete Request
          BeginDataXfer(buffers[j]); // Submit New Request
          j++
          if (j == QueueSize) j=0; // Recirculate Through the
            Buffers
        }
      }
    }
  }
}
```

This example pseudo code embodiment shows a nested structure to pin buffers in the managed memory environment and submit requests to the peripheral device 140. In this example embodiment, the total number of buffers pinned (4) is hard-coded. As shown above, the pinning of the memory buffers is performed prior to the submission of requests, as the memory manager 110 may automatically relocate the buffers prior to their pinning. When the memory manager 110 automatically relocates buffers prior to their pinning, the IO controller 130 may access the wrong buffer during the execution of the application 120.

After the buffers are pinned, the pseudo code enters a data transfer loop that awaits completion of requests by the peripheral device 140 and then asynchronously completes the requests by storing data from the peripheral device 140 to the pinned buffers or by retrieving data from the pinned buffers and forwarding the data to the peripheral device 140. Embodiments of these data transfer operation will be shown and described below in greater detail.

In some embodiments, the application 120 and the IO controller 130 may reuse the pinned buffers, e.g., to implement a circular queue with the pinned buffers. By implementing a circular queue the application 120 may limit the number of buffers it pins, thus reducing the impact on the managed memory environment.

Another example of pseudo-code for pinning buffers in memory 115 is shown and described below.

```
public LockNLoad(j, byte[ ] [ ] buffers)
{
  fixed (byte* b0 = buffers[j]) // Pin a Buffer
  {
    BeginDataXfer(buffers[j]); // Submit Request to Peripheral
      Device 140
    j++;
    if (j < QueueSize) //
      LockNLoad(j, buffers); // Recursive Call to Pin More Buffers
    else
    {
      j = 0;
      for ( ; bTransferring; ) // Data Transfer Loop
      {
        WaitForXfer(j); // Await Request Completion
        FinishDataXfer(buffers[j]); // Complete Request
        BeginDataXfer(buffers[j]); // Submit New Request
        j++
        if (j == QueueSize) j=0; // Recirculate Through the Buffers
      }
    }
  }
}
```

In this example pseudo code embodiment, the application 120 uses a recursive call to pin buffers in the managed memory environment and submit requests to the peripheral device 140. By introducing the recursive call, as opposed to the nested structure, the size of the circular queue may be dynamically determined by a variable (QueueSize), instead of hard-coded as shown above. Although not shown in either of the pseudo codes above, the application 120 may complete execution by exiting from the data transfer loop and releasing the pinned buffers to the memory manager 110.

Figure 2:
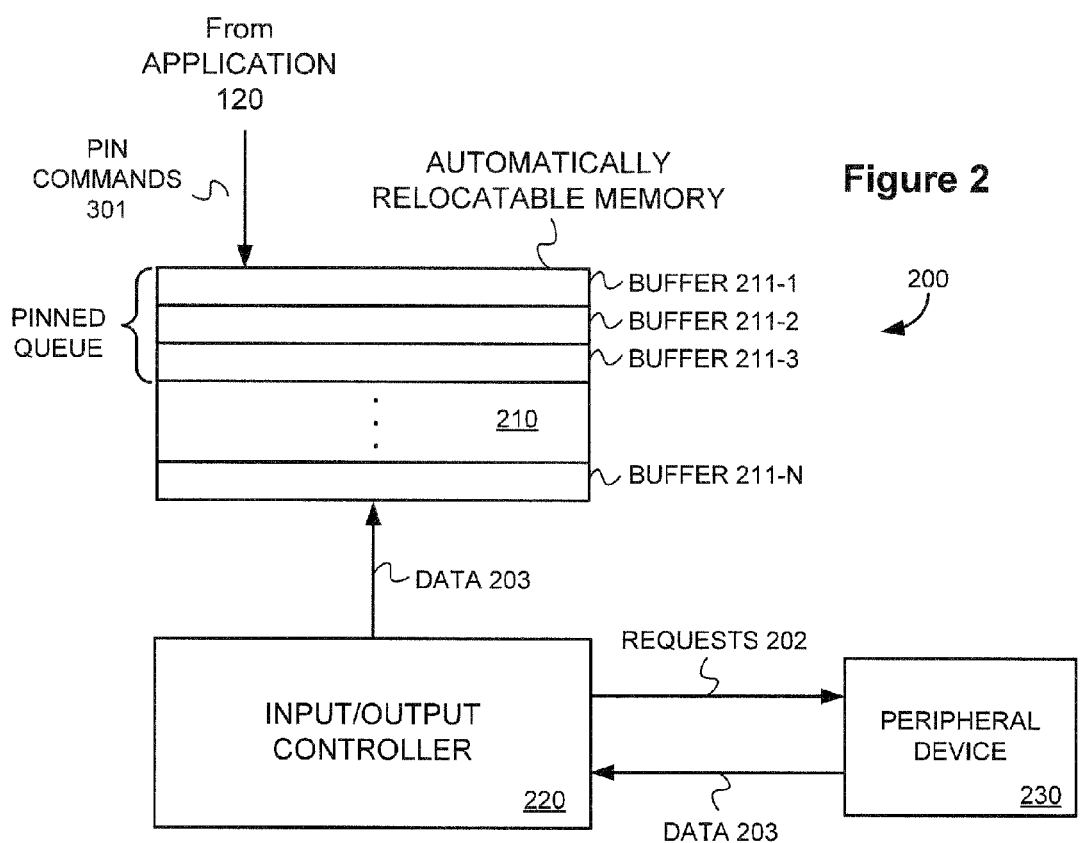
FIGS. 2 and 3 illustrate example operational embodiments of the memory system shown in FIG. 1.

FIG. 2 illustrates an example data storage embodiment in the memory system shown in FIG. 1. Referring to FIG. 2, the memory system includes a peripheral device 230 to transfer data 203 to an automatically relocatable memory 210. The automatically relocatable memory 210 may be a managed memory operating in a pointer-less memory environment, thus allowing buffers 211-1 to 211-N to be automatically relocated.

An IO controller 220 may perform operations as directed by an application, such as a data streaming application, and facilitate the transfer of data from the peripheral device 230 to the automatically relocatable memory 210. When the application requires or requests a queue of fixed-address memory buffers to store data from the peripheral device 230, it may pin the buffers 211-1 to 211-3 by providing pin commands 201 to the automatically relocatable memory 210. By pinning of the buffers 211-1 to 211-3, the application 120 fixes the memory addresses of the pinned buffers 211-1 to 211-3, thus ensuring they will not be automatically relocated.

The IO controller 220 may provide requests 202 to the peripheral device 230, each request 202 for the peripheral device 230 to send data 203 to the IO controller 220 for storage to one or more of the pinned buffers 211-1 to 211-3. In some embodiments, each request 202 corresponds to one of the pinned buffers 211-1 to 211-3.

Figure 3:
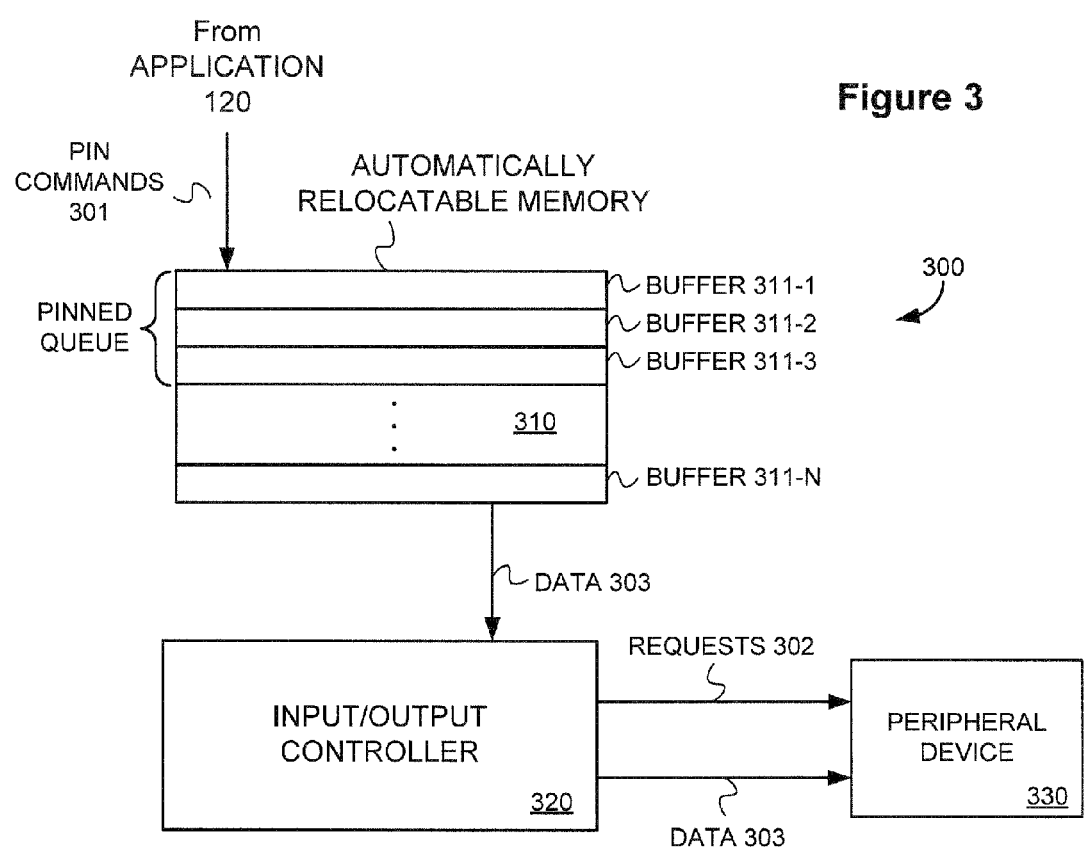

The peripheral device 230 sends data 203 to the IO controller 220 responsive to the requests 202. The IO controller 220 may store the data 203 to the associated pinned buffers 211-1 to 211-3. In some embodiments, the peripheral device 230 may provide the data 203 directly to the associated pinned buffers 211-1 to 211-3. FIG. 3 illustrates an example data retrieval embodiment in the memory system shown in FIG. 1. Referring to FIG. 3, the memory system includes a peripheral device 330 to receive data from an automatically relocatable memory 310. The automatically relocatable memory 310 may be a managed memory operating in a pointer-less memory environment, thus allowing buffers 311-1 to 311-N to be automatically relocated.

An IO controller 320 may perform operations as directed by an application, such as a data streaming application, and facilitate the transfer of data 303 to the peripheral device 230 from the automatically relocatable memory 310. When the application requires or requests a queue of fixed-address memory buffers to store data to be transferred to the peripheral device 330, it may pin multiple buffers in the automatically relocatable memory 310, e.g., buffers 311-1 to 311-3.

The application 120 may pin the buffers 311-1 to 311-3 by providing pin commands 301 to the automatically relocatable memory 310. By pinning of the buffers 311-1 to 311-3, the application 120 fixes the memory addresses of the pinned buffers 311-1 to 311-3, thus ensuring they will not be automatically relocated.

The IO controller 320 may provide requests 302 to the peripheral device 330, each request 302 for the peripheral device 330 to receive data 303 from one or more of the pinned buffers 211-1 to 211-3. In some embodiments, each request 302 corresponds to one of the pinned buffers 311-1 to 311-3.

When the peripheral device 330 is ready to receive the data 303, the IO controller 320 retrieves data 303 from one or more pinned buffer 211-1 to 211-3 and forwards the data 303 to the peripheral device 330. In some embodiments, the peripheral device 330 may retrieve the data 203 directly from one or more of the pinned buffers 211-1 to 211-3. When the application 120 determines to use the pinned buffers 211-1 to 211-3 as a circular queue, it may issue new requests to the IO controller 320 for subsequent data retrieval.

FIG. 4 shows another example flowchart illustrating embodiments of the memory system shown in FIG. 1. Referring to FIG. 4, in a block 410, the application 120 pins memory buffers in a managed memory environment. The application 120 may pin the memory buffers through a nested structure of pin commands or through a recursive call, as shown and described above.

In a block 420, the IO controller 130 issues data transfer requests to a peripheral device 140, each request corresponding to at least one of the pinned memory buffers. The requests may indicate that the peripheral device 140 is to receive data from the host 100 or to store data to the host 100.

In a block 430, the IO controller 130 determines the peripheral device 140 performed the request. When the request is for the peripheral device 140 to send data to the host 100, the IO controller 130 may determine the peripheral device 140 performed the request when the requested data is sent to the host 100. When the request is for the peripheral device 140 to receive data from the host 100, the IO controller 130 may receive an indication that the peripheral device 140 is ready to receive data from the host 100. In a block 440, the IO controller 130 asynchronously accesses the pinned buffers responsive to the determination that the peripheral device 140 performed the request.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Although the embodiments presented above show a Universal Serial Bus application, a person skilled in the art understands the embodiments shown and described above may incorporate other transmission media and/or data transfer protocols.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method comprising:
pinning memory buffers in a managed memory environment by using a recursive function call to allow a variable number of memory buffers to be dynamically pinned;
issuing data transfer requests to a peripheral device, each request corresponding to at least one of the pinned memory buffers; and
asynchronously accessing at least one of the pinned buffers in response to the requests.

2. The method of claim 1 including issuing one or more additional requests to a peripheral device, each additional request corresponding to at least one pinned memory buffer previously associated with a different data transfer request.

3. The method of claim 1 includes issuing data transfer requests to a peripheral device after pinning the memory buffers.

4. The method of claim 1 includes implementing a circular queue with the pinned memory buffers by reusing one or more of the pinned memory to store data associated with the peripheral device.

5. The method of claim 1 includes determining the peripheral device performed the request, and asynchronously accessing at least one of the pinned buffers responsive to the determining.

6. A system comprising:
a memory manager to control a memory having multiple memory buffers in a pointer-less environment;
a central processor to perform an application that is adapted to prompt the memory manager to pin one or more of the memory buffers through a recursive function call to allow a variable number of memory buffers to be dynamically pinned; and
an input-output controller to issue data transfer requests to a peripheral device, each request corresponding to at least one of the pinned memory buffers, and to asynchronously access at least one of the pinned buffers responsive to the requests.

7. The system of claim 6 where the input-output controller is configured to issue one or more additional requests to a peripheral device, each additional request corresponding to at least one pinned memory buffer previously associated with a different data transfer request.

8. The system of claim 6 where the input-output controller is configured to determine the peripheral device performed the request, and asynchronously access at least one of the pinned memory buffers responsive to the determining.

9. The system of claim 6 where the input-output controller is configured to issue data transfer requests to a peripheral device after pinning the memory buffers.

10. The system of claim 6 where the input-output controller is configured to implement a circular queue with the pinned memory buffers by reusing one or more of the pinned memory to store data associated with the peripheral device.

11. A system comprising:
means for pinning memory buffers in a managed memory environment, wherein the means for pinning memory buffers comprises means for performing a recursive function call allowing a variable number of memory buffers to be dynamically pinned;
means for issuing data transfer requests to a peripheral device, each request corresponding to at least one of the pinned memory buffers; and
means for asynchronously accessing at least one of the pinned buffers responsive to the requests.

12. The system of claim 11 where the means for pinning of the memory buffers includes performing a recursive function call allowing the variable number of memory buffers to be dynamically pinned.

13. The system of claim 11 including means for issuing one or more additional requests to a peripheral device, each additional request corresponding to at least one pinned memory buffer previously associated with a different data transfer request.

14. The system of claim 11 includes means for issuing data transfer requests to a peripheral device after pinning the memory buffers.

15. The system of claim 11 includes means for implementing a circular queue with the pinned memory buffers by reusing one or more of the pinned memory to store data associated with the peripheral device.

* * * * *